Aug. 5, 1941.  H. L. LESCARBEAU  2,251,746
ABSORPTION REFRIGERATION SYSTEM
Filed March 17, 1939  5 Sheets-Sheet 2
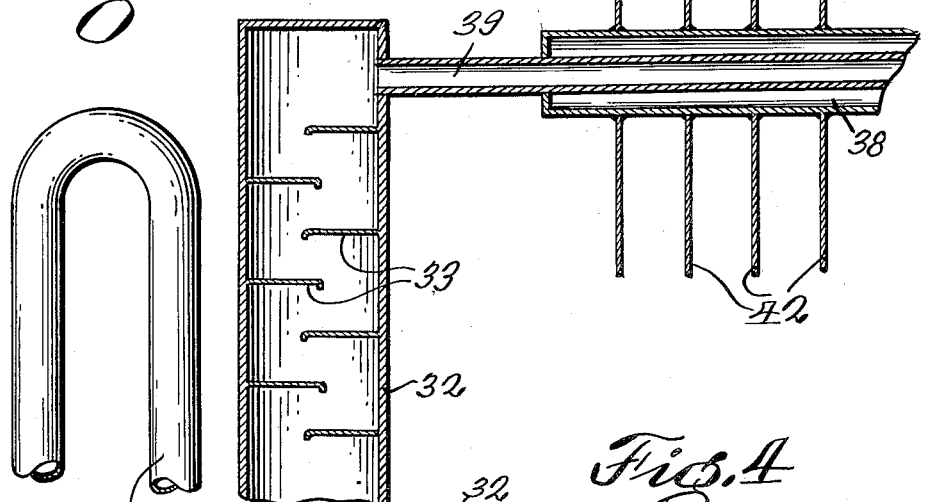
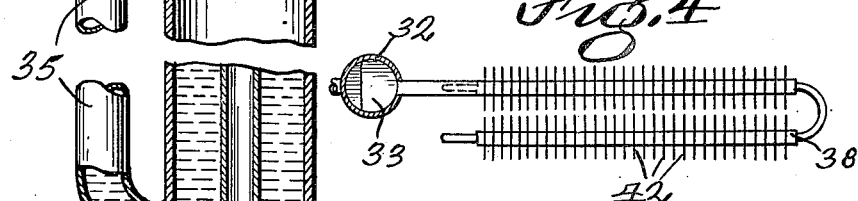
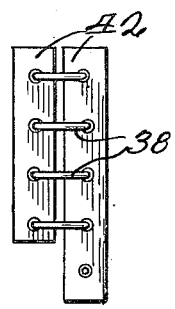
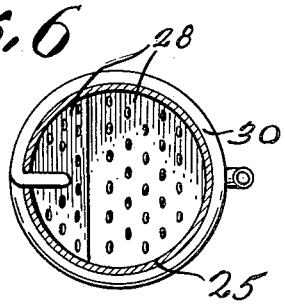
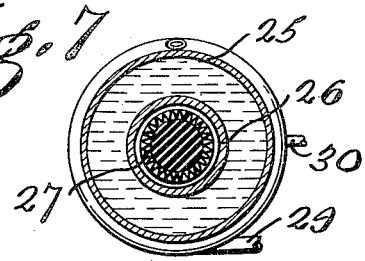
Inventor
Horace L. Lescarbeau
By
Attorneys

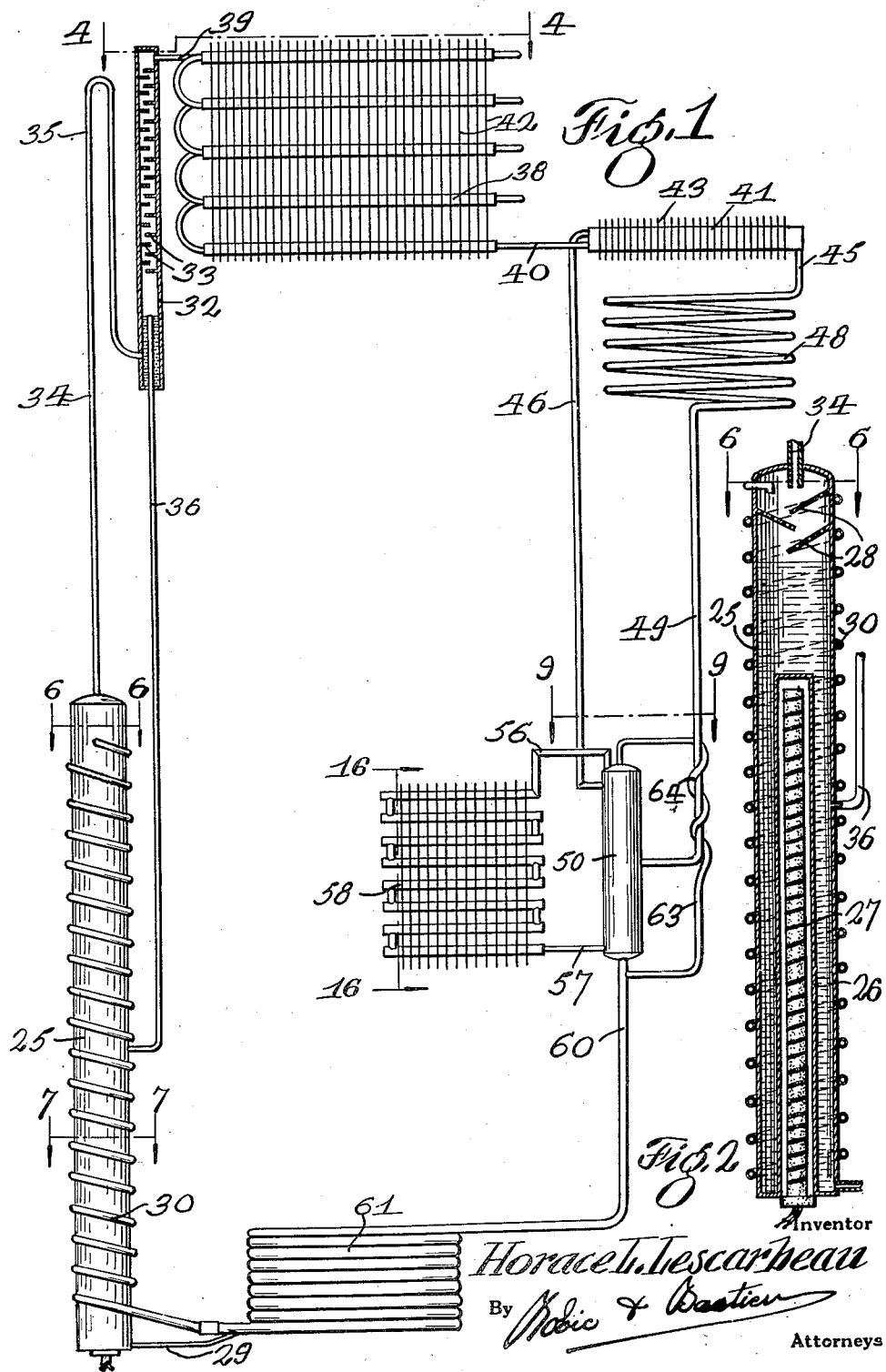

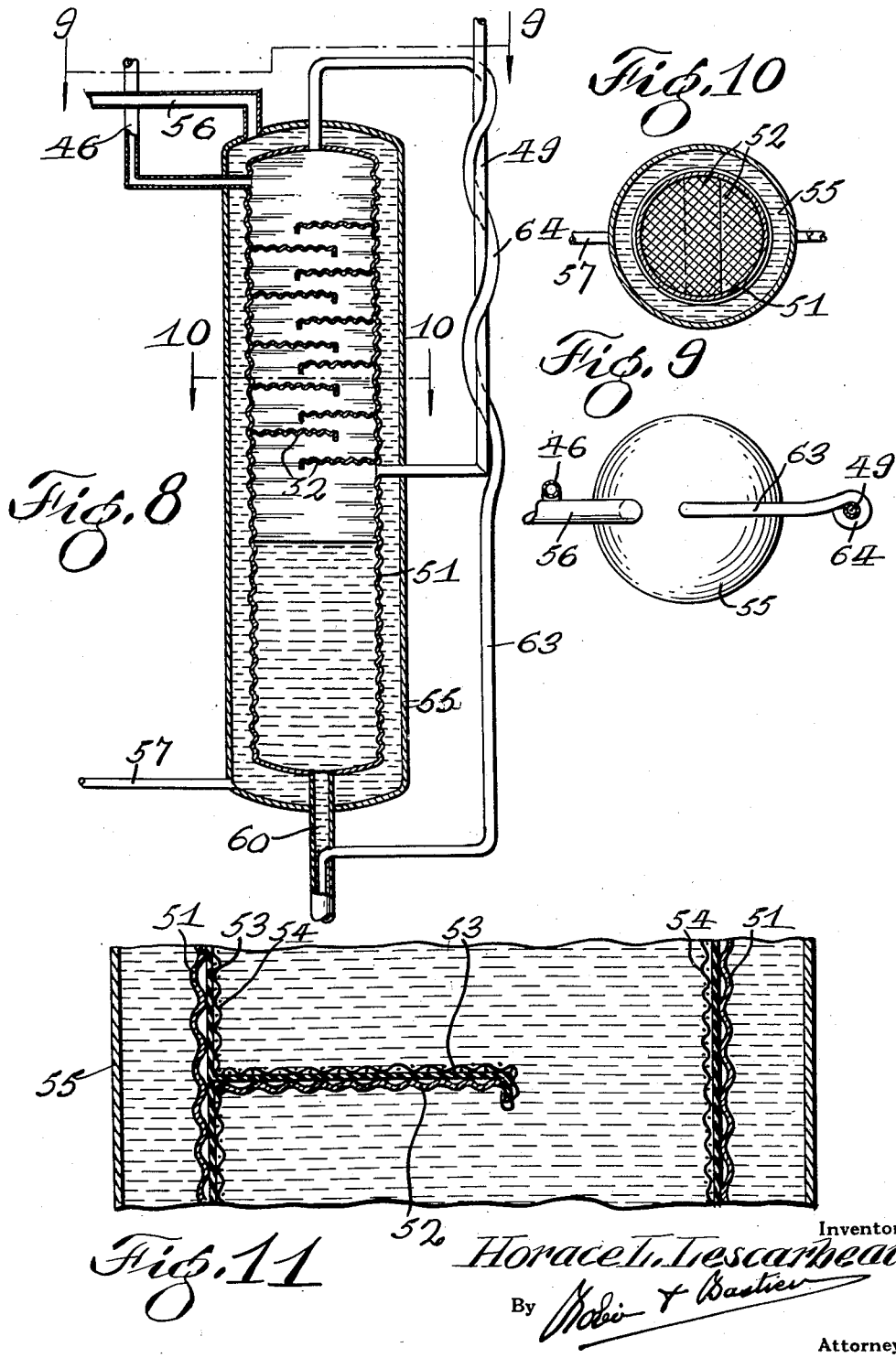

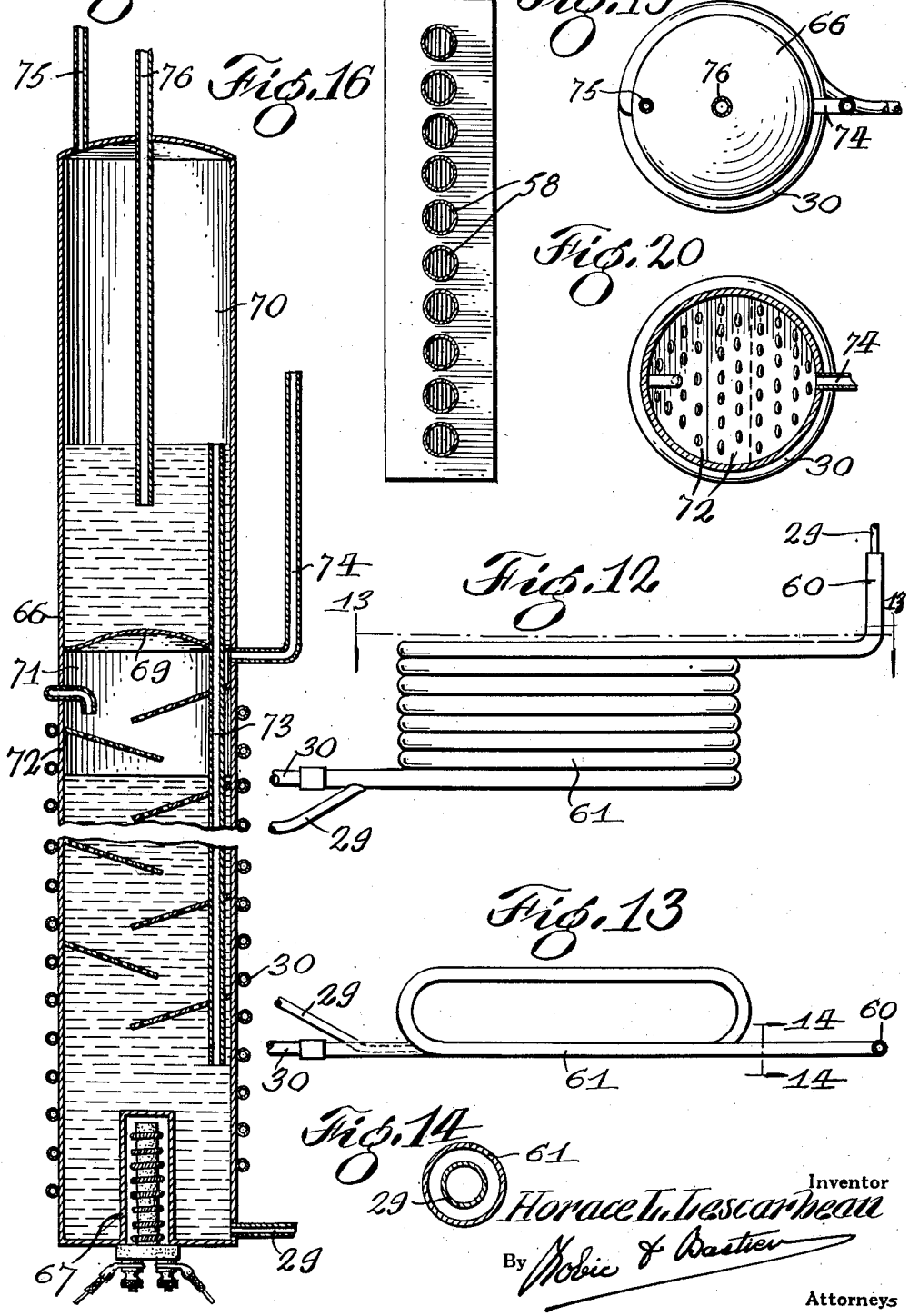

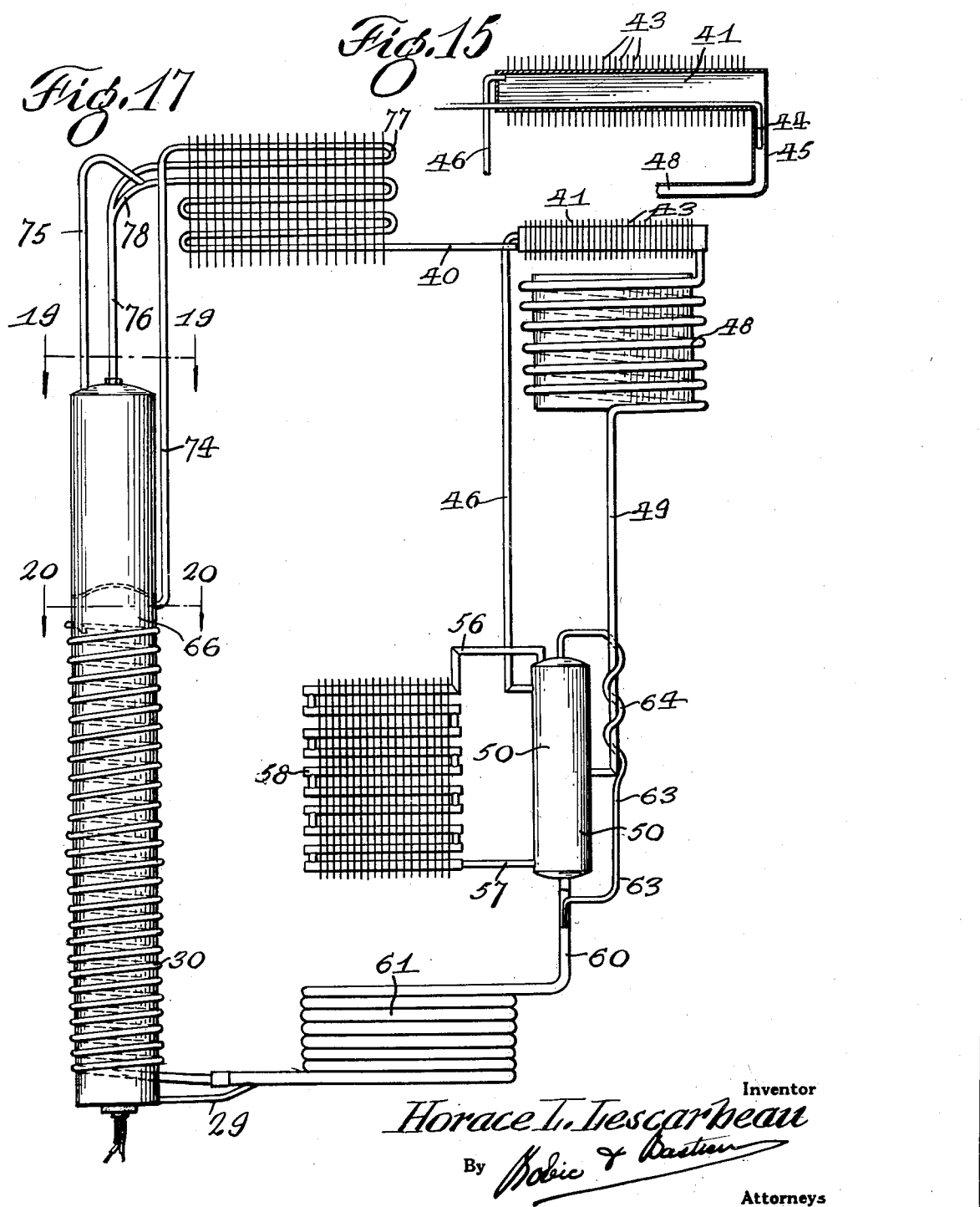

Patented Aug. 5, 1941

2,251,746

UNITED STATES PATENT OFFICE 2,251,746

ABSORPTION REFRIGERATION SYSTEM

Horace L. Lescarbeau, Montreal, Quebec, Canada

Application March 17, 1939, Serial No. 262,425

2 Claims. (Cl. 62—119.5)

The present invention relates to improvements in absorption refrigeration systems.

An object of the invention is the provision of a refrigeration system of generally improved design.

Another object of the invetnion is the provision of a refrigeration system having increased efficiency.

A further object of the invention is the provision of a refrigeration system embodying improved absorption means.

Still another object of the invention is the provision of a refrigeration system having means for effecting improved circulation of a pressure equalizing fluid.

Other object and advantages of the invention will become apparent as the description progresses.

In the accompanying drawings forming a part of this specification and in which like reference characters are employed to designate corresponding parts throughout the same:

Figure 1 is a more or less diagrammatic view of one form of apparatus embodying the invention, Figure 2 is a longitudinal section through the generator thereof, Figure 3 is an enlarged detail section through the rectifier, Figure 4 is an enlarged section taken on the line 4—4 of Figure 1, Figure 5 is an end view of the same, Figure 6 is an enlarged transverse section taken on the line 6—6 of Figure 1, Figure 7 is a similar section taken on the line 7—7 of Figure 1, Figure 8 is a longitudinal section through the absorber of the apparatus, Figure 9 is a section taken on the line 9—9 of Figure 8, Figure 10 is a section taken on the line 10—10 of Figure 8, Figure 11 is an enlarged fragmentary section through the intermediate portion of Figure 8, Figure 12 is an enlarged fragmentary detail elevation of a heat exchanger coil, Figure 13 is a section along the line 13—13 of Figure 12, Figure 14 is an enlarged section taken on the line 14—14 of Figure 13, Figure 15 is an enlarged longitudinal section through a reservoir of the apparatus, Figure 16 is an enlarged section taken on the line 16—16 of Figure 1, Figure 17 is a diagrammatic view of another form of the apparatus, Figure 18 is a longitudinal section through the generator thereof, Figure 19 is a section taken on the line 19—19 of Figure 18, and Figure 20 is a section taken on the line 20—20 of Figure 17.

Referring to a preferred embodiment of the invention illustrated at Figures 1 to 16 inclusive, 25 designates a generator in the form of an elongated cylindrical shell arranged vertically and provided with a concentric flue 26 in the lower portion. This flue is adapted to receive an electric heating element 27 or other suitable heating means and extends from the bottom to a point above the middle section of the shell. In the upper portion of the shell 25 are mounted a plurality of inclined perforated baffles 28. A conduit 29 has communicative connection with the lower end portion of the shell and extends transversely therefrom. Another conduit 30 is wound in a coil about the exterior of the shell from the bottom portion to a point adjacent the top wherein the upper outlet of the conduit extends through an aperture in the shell into the interior.

Above the generator 25 is mounted a vertically disposed rectifier 32 in the form of a cylindrical tube provided with a plurality of baffles 33 within its exterior. A riser conduit 34 connects the generator with the rectifier, the lower end of the conduit making communicative connection with the central top head of the generator shell, while the upper portion is bent to form a loop 35. The upper end of the conduit 34 connects with the lower portion of the tubular member 32 above the bottom end. A vertically disposed drain conduit 36, having the upper portion projecting through an aperture in the bottom end of the rectifier so that its upper open end terminates at a point above the connection of the conduit 34, extends downwardly and connects with the intermediate portion of the generator 25.

A condenser, in the form of a horizontally disposed coil 38, is mounted so that its inlet extension 39 connects with the upper end portion of the rectifier 32, while the bottom outlet extension conduit 40 extends horizontally to a vessel 41. The coil 38 is preferably provided with heat transfer or cooling fins 42.

The vessel 41, in the form of a cylindrical shell having exterior cooling fins 43, is arranged horizontally in a position approximately in alignment with the bottom extension of the coil 38. The outlet conduit 40 extends through one end of the vessel 41 and longitudinally therein, preferably in contact with the bottom, as shown at Figure 15, and is provided with a downward extension 44 within a downwardly directed discharge tube 45 at the opposite end of the vessel. A vertically disposed conduit 46 is arranged so that its upper end connects with the inlet end of the vessel 41.

To the tube 45 is connected an evaporator 48 in the form of a coil arranged below the vessel 41 and having its bottom convolution connecting with a vertically depending conduit 49 which connects with an absorber 50 at an intermediate position. This absorber preferably embodies an interior cylindrical shell 51 supported vertically and having the side wall corrugated and provided in the upper portion with a plurality of spaced horizontally extending trays 52 which are also of corrugated form. The interior of the shell 51 and the top surfaces of the trays 52 are lined with absorbent sheeting 53, of any preferred fibrous or other similar material, firmly held in position by wire screening 54. The shell 51 is mounted concentrically within and spaced from an exterior cooling jacket 55 having top and bottom conduit connections 56 and 57 which connect with a cooling coil 58. This construction is designed to provide efficient circulation of the cooling fluid between the shell and the jacket. The bottom of the conduit 46 connects with the top of the shell 51.

To the bottom of the absorber shell 51 is connected a pipe 60 extending downwardly therefrom and extended to form or connecting with a coil 61. The outlet end of this coil connects with the lower end of the coiled conduit 30. The conduit 29 connects with an extension of relatively small bore disposed concentrically in spaced relation within the coil 61 and the pipe 60, separating from the latter at a point just below the absorber to assume an approximately U-shaped form 63 exteriorly of the absorber and connecting with the top of the absorber shell. This extension 63 is formed so that a section 64 is coiled about the lower portion of the conduit 49 to provide a heat exchanger.

In operation, the generator is adapted to contain a refrigerant, such as ammonia, in solution in an absorption fluid such as water which, upon being heated, expels the ammonia with some entrained absorption fluid. This vapor is conducted through the riser conduit 34 into the lower portion of the rectifier vessel 32. Part of any water vapor is condensed in the riser conduit and flows back into the generator while fluid condensed in the rectifier collects in the bottom portion which provides an analyzer section or chamber. The arrangement of the drain pipe 36 is such that liquid can accumulate in this analyzer to a predetermined level, above the level of the inlet of the conduit 34.

The practically pure ammonia vapor arising at the top of the rectifier passes through the connection 39 into and through the cooled coil 38 to be liquefied therein. Condensed ammonia passing from the condenser is conducted through the duct 40, which extends through the vessel 41, and discharges therefrom in the outlet 45. The vessel 41 functions as a receiver or reservoir for an auxiliary inert fluid, functioning as a pressure equalizer, such as hydrogen gas which enters the inlet end of the vessel through the conduit 46. In the connection 45, which forms an outlet of the vessel and an inlet to the adjacent evaporator, the ammonia evaporates in the presence of and diffuses in the auxiliary gas to produce refrigeration, these mixed gases passing through the evaporator coil and downwardly through the conduit 49 to enter the mid-portion of the absorber shell above the liquid level therein. As shown at Figures 1 and 8, the gases in the pipe 49 are conducted in heat exchange relation with the coil section 64 of the pipe employed to conduct weak solution liquor from the lower end of the generator into the top of the absorber. In consequence thereof, the relatively weak solution liquid falling through the absorber shell absorbs the ammonia, such absorption being facilitated by the fibrous material in the shell and on the trays, with the result that an enriched solution liquor accumulates in the bottom of the shell and is conducted therefrom by the pipe 60. While the ammonia is thus absorbed into the absorption liquor, the inert gas passes therefrom through the duct 46 and returns to the receiver 41 to repeat its operative cycle.

The enriched solution is conducted from the absorber through pipe 60 and coil 61 in thermal relation with the relatively hot liquid carrying tube 29 and is pumped, by thermo-syphonic action through the coil 30, into the top of the generator above the level of the liquid therein where it flows over the perforated baffles 28 to liberate refrigerant vapor.

The vapor conducted through the riser 34 from the generator is bubbled through the liquid which accumulates in the bottom part of the rectifier vessel 32, effecting analyzation and providing a substantially pure ammonia vapor in the upper part of the rectifier. The excess liquid from the lower part of this vessel is conducted into the generator, through the medium of pipe 36, at an intermediate point, between the relatively weak solution at the bottom and the strong solution in the upper part.

Within the absorbing chamber, the absorbent sheeting 53, together with the circulation of cooling fluid about the absorber shell, which may be an anti-freeze liquid, provides means for very efficient absorption of the refrigerant and its circulation through the primary circuit.

In another form of the apparatus, illustrated at Figures 17 to 20 inclusive, designed particularly for installations of smaller size, the generator embodies a cylindrical vertically elongated shell 66 provided with a flue 67 in the bottom. In the intermediate portion of the shell, just above its midsection, is provided a convex horizontal partition 69 dividing the shell into upper and lower chambers 70 and 71, the latter having a plurality of baffles 72 therein. A conduit 73 extending vertically through the partition opens at a predetermined point in the upper chamber and is adapted to conduct liquid accumulating above this level into the lower chamber. A vapor take-off conduit 74 connects with the lower chamber just below the partition, while another vapor conduit 75 connects with the top of the shell. A return pipe 76 extends to the top of the shell and down into the upper chamber with its bottom open end disposed below the normal liquid level therein.

The vapor conduit 74 connects with the upper section of a condenser coil 77, while a pair of lower sections of the coil connect with the return pipe 76 providing an arcuate bifurcated loop 78 for effectively draining unvaporized fluid, mainly absorption liquid, from the upper part of the condenser. The auxiliary vapor conduit 75 is adapted to conduct any vapor in the upper chamber 70 into the condenser.

The remainder of this modified form of apparatus may correspond to that of the form hereinbefore described.

This refrigeration means provides a system which operates with great efficiency and which enables very effectual utilization of the interior space of a cabinet. The receiving vessel 41 interposed between the condenser and the evaporator and preferably arranged in close proximity to the latter is an important feature in that it assures liquefaction of the refrigerant under conditions where the room temperature is comparatively high and condensation is incomplete in the condenser coil, and cools the inert gas passing through the vessel to increase its diffusion with the refrigerant and circulation through the secondary circuit of the system. With this in mind, the conduit 40 from the condenser coil extending through the receiving vessel preferably maintains contact with the bottom of the shell and may advantageously be welded thereto.

The tube 30 coiled about a substantial portion of the generator shell is also of great utility in that it utilizes the excess heat from the generator heater to pump the rich liquor from the bottom of the absorber into the top of the generator chamber, thereby maintaining a high fluid level in the latter resulting in desired circulating pressure. The coiled conduit 30 may be welded to the exterior of the generator shell and, where greater pumping action would be useful, could be augmented by another coil arranged interiorly of the shell. This arrangement, together with the arrangement wherein the weak liquor from the bottom of the generator is conducted to the top of the absorber, provides effective circulation inasmuch as the weak absorption liquid flowing downwardly through the absorber creates a suction in the system which increases the movement of fluids through the circuits and causes very efficient movement of the auxiliary gas through its secondary circuit.

Such construction and assembly of the apparatus enables mounting the same in a relatively narrow chamber at the rear of a refrigerator cabinet, so that the interior structure may be formed to extend the full length of the cabinet and materially increases the capacity thereof in proportion to the external dimensions, having in mind that no space would be required below the container body of the cabinet.

It will be obvious to those skilled in the art that many changes may be made in construction and arrangement of the system and the method without departing from the spirit of the invention and, therefore, the invention is not limited to what is shown in the drawings and described in the specification but only as indicated in the annexed claims.

Having thus described my invention, I claim:

1. A generator for refrigerating apparatus comprising an elongated shell having a partition above its midsection dividing the shell into upper and lower chambers, a conduit disposed vertically in the shell extending through the partition to afford communication between the chambers, a conduit coiled about the exterior of the shell and having the upper end opening into the upper part of the lower chamber, a vapor outlet in the upper part of the said lower chamber, a vapor outlet at the top of the upper chamber, and means for heating the lower chamber of the shell.

2. In absorption refrigerating apparatus a generator, a condenser arranged at a level above the generator, a vertically elongated rectifier shell, a vapor conduit having communicative connection with the generator and connecting with the rectifier shell at a point in the lower portion above the bottom end, a drain conduit connecting with the generator and having its upper portion projecting through the bottom of the rectifier shell and its top end opening therein above the connection of the vapor conduit, and a conduit connecting the upper part of the rectifier shell with the condenser.

HORACE L. LESCARBEAU.